Nov. 22, 1932.   R. W. SMITH   1,888,244
MECHANISM FOR MAKING MATCH BOOKS
Filed Aug. 13, 1929   6 Sheets-Sheet 3

INVENTOR
RUSSELL W. SMITH
BY A. D. T. Libby
ATTORNEY

Nov. 22, 1932.  R. W. SMITH  1,888,244

MECHANISM FOR MAKING MATCH BOOKS

Filed Aug. 13, 1929  6 Sheets-Sheet 4

INVENTOR
RUSSELL W. SMITH
BY
*A. D. T. Libby*
ATTORNEY

Nov. 22, 1932.  R. W. SMITH  1,888,244
MECHANISM FOR MAKING MATCH BOOKS
Filed Aug. 13, 1929  6 Sheets-Sheet 5

INVENTOR
RUSSELL W. SMITH
BY
A. D. T. Libby
ATTORNEY

Nov. 22, 1932.    R. W. SMITH    1,888,244
MECHANISM FOR MAKING MATCH BOOKS
Filed Aug. 13, 1929    6 Sheets-Sheet 6

INVENTOR
RUSSELL W. SMITH
BY
A. D. T. Libby
ATTORNEY

Patented Nov. 22, 1932

1,888,244

UNITED STATES PATENT OFFICE

RUSSELL W. SMITH, OF UNION, NEW JERSEY

MECHANISM FOR MAKING MATCH BOOKS

Application filed August 13, 1929. Serial No. 385,537.

This invention relates to the method of making book matches from paper or cardboard, and to the apparatus used for carrying out the invention.

My present invention relates to the improvement in certain details or parts of the apparatus as shown and described in my application Ser. No. 283,160, filed June 6, 1928. In the machine described in said application, the paper or cardboard for making the match splint strips is taken in at one part of the machine, and the splint strips are prepared in that part and then transferred to a conveyer, the strip being continuous up to and including the time the end of the strip has been inserted into suitable strip retaining means on the conveyer, after which instant, the continuous strip is sheared at the proper place, thereby forming the match strip already positioned on the conveyer.

From the press which makes the match strips, the conveyer carries the strips to a paraffin bath, and then to a part of the machine where the ends of the splints are tipped with an igniting compound, after which the strips are dried while still on the conveyer; and after the drying is completed, the conveyer brings the match strips to a part of the machine where they are assembled with the cover material which is brought into the machine at another part, treated with abrasive material, printed, and dried ready for the assembly operation.

These various steps and the means for carrying them out, are fully described in said previously mentioned application and will therefore not be further described herein, except in a general way, it being one of the objects of my present invention to provide certain improved methods of handling the assembly operations, and to provide improvements in the mechanism for carrying out the assembly functions.

My present improvements are set forth in the annexed drawings, wherein:

Figure 1 is a schematic view of the entire apparatus, showing the various parts of the mechanism in their relative operative positions, whereby a general understanding of the operations of the complete machine is set forth. This figure is very much the same as Figure 1 of my application heretofore referred to.

Figure 1:
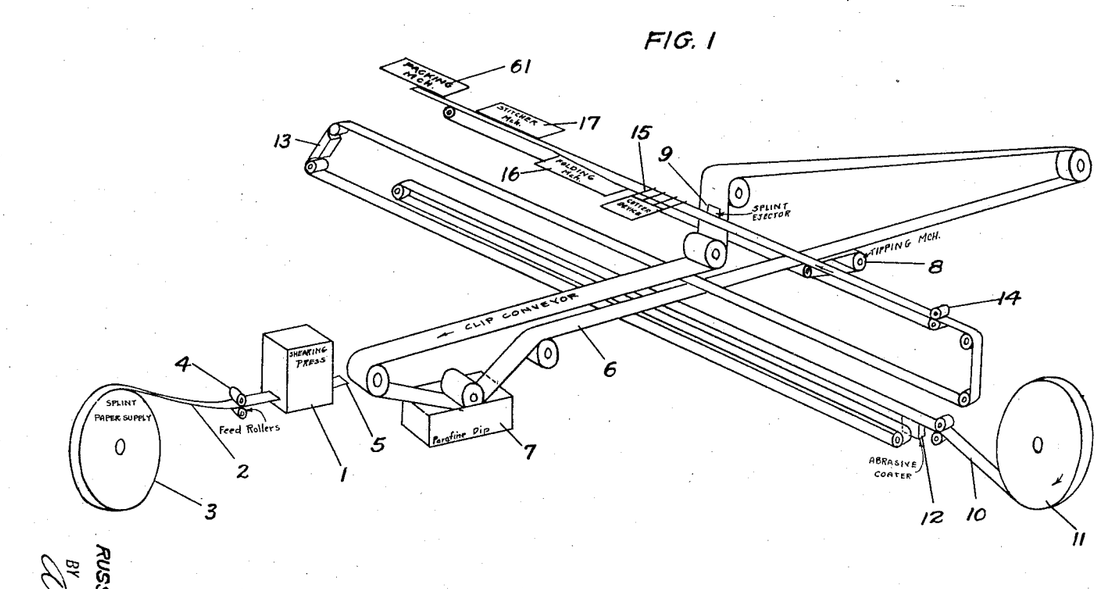

Before describing in detail, the parts shown in the various views, reference should be made to Figure 1, which shows the entire machine in a schematic manner. In Figure 1, 1 is a press which takes a continuous strip of paper 2 from a supply roll 3, through the feed rollers 4 and other mechanism not shown but which is more fully described in my previously mentioned application, and forms match splints from the strip 2 as this is drawn through the press.

The end 5 of the continuous strip is inserted in a suitable clip engaging means carried by the conveyer 6, and just after the end 5 is inserted into said clips, shearing means operated by the press 1 sever the strip 2 transversely to separate the splint ends into strips. The mechanism which is not shown, is used to separate the splint ends so that they may be properly dipped in the paraffin tank 7 from which place they are conveyed to another tank 8 where they are tipped with igniting material. As the conveyer moves onward, the splint strips are dried while on the conveyer through any suitable method of drying, either artificial or otherwise, and they are then brought back to the point 9 where they are ejected on to the cover paper on a suitable assembly platform which will be later referred to.

While the aforesaid operations have been going on, the cover paper 10 is taken to a device 12 which applies an abrasive coating to one edge of the strip, which abrasive coating is used for igniting the match. After leaving the abrasive coater, the strip is carried through the machine so that this coating is dried (the drying apparatus not being shown), and then it is conveyed to the printing press 13 where suitable indicia is printed on the cover, and after further traveling through the machine for the purpose of drying the printed matter, the cover strip is then drawn by the feed rollers 14 which force it on to the pins carried by the assembly conveyer belt to be later described, which pins provide the motive power for drawing the cover paper through the machine. After passing the assembly point 9 where the match splints are ejected from the main conveyer on to the cover, the cover with the match splints passes through the assembly mechanism at the point 9, thence to the cutting mechanism 15, then to the folding mechanism 16, and to the stitcher 17, from which point the match books are ejected from the machine into a packing mechanism 61, where they are packed ready for shipment.

Figure 2:
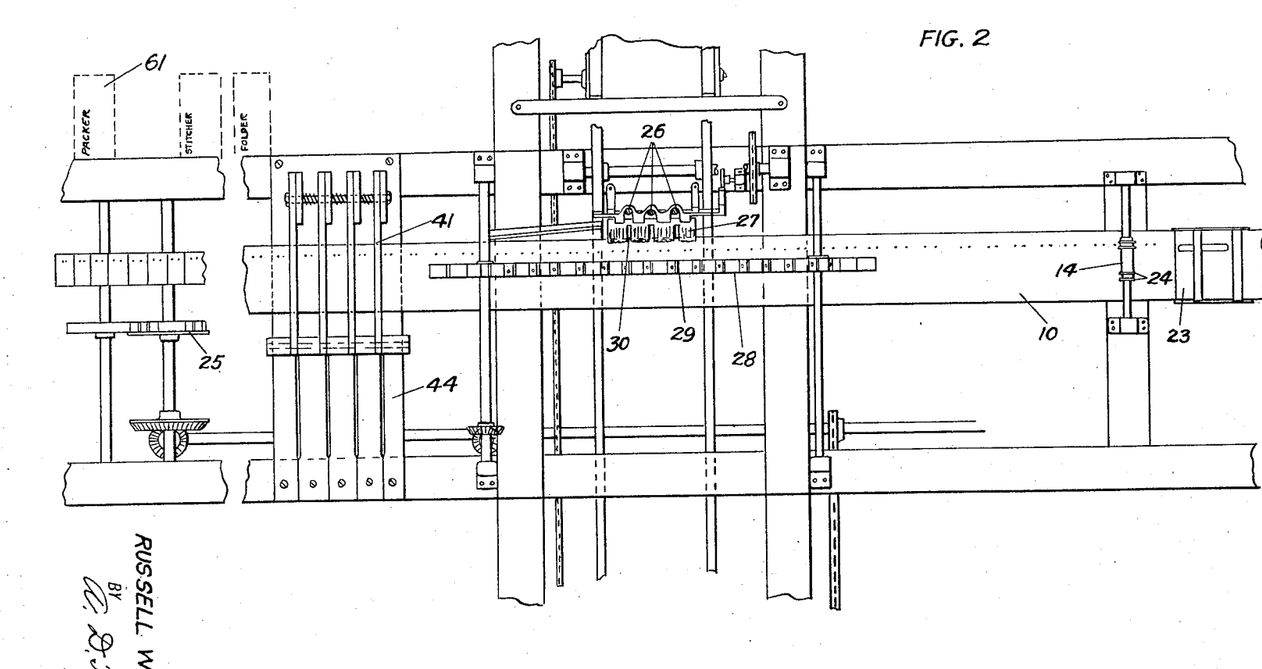
Figure 2 is a plan view of the assembly part of the machine, with many of the parts removed at the place where the assembly operations begin, showing the strip of cover paper which has been passed through the lower portions of the machine where it has been treated with the abrasive material for igniting the matches, and with the printing and drying operations completed. This view also shows the means for applying the paper to the pins which provide the motive power for drawing the cover strip through the machine, the creasing means for creasing the covers so that they may be more readily folded, the assembly portion of the machine, followed by the cutting mechanism which cuts the match strips into books while they are in flat position. This view further shows the position of the folding, stitching and packing mechanism.
Figures 3, 8, 9, 13, 14:
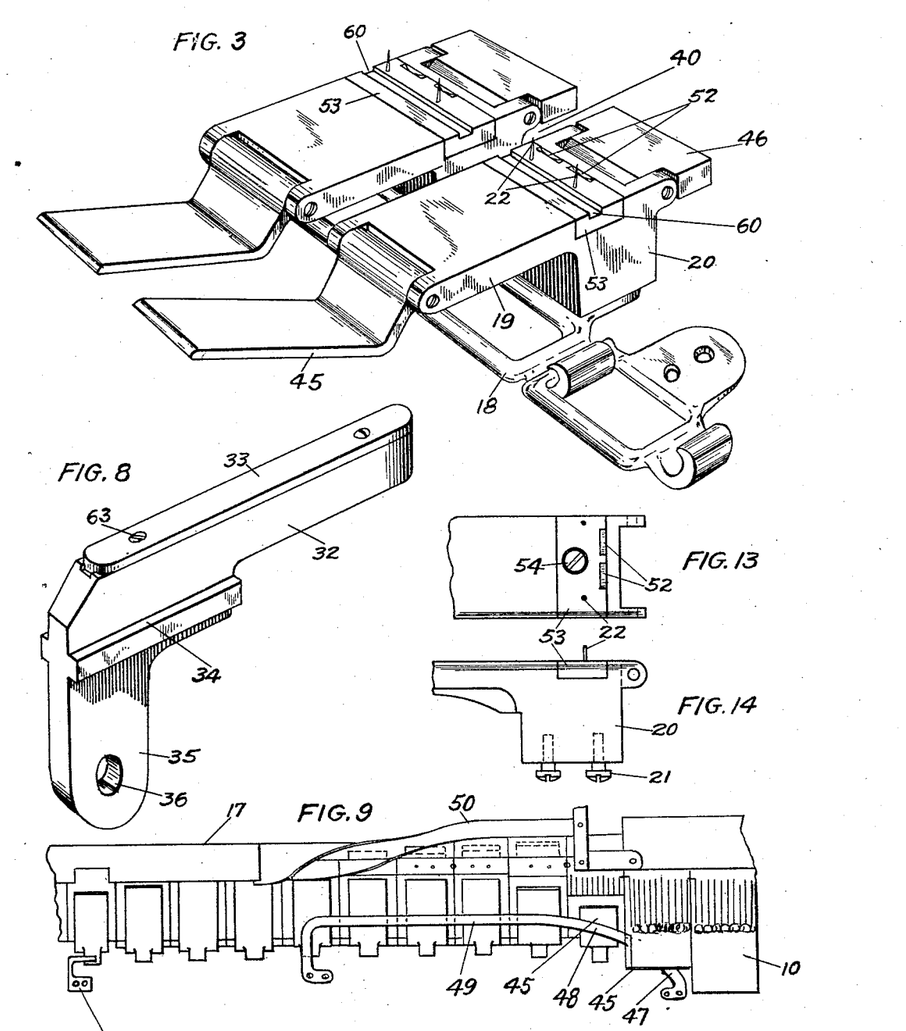
Figure 3 is a perspective view showing two units of the endless conveyer belt which is used in the assembly part of the machine for carrying the cover and match strips through the assembly process.
Figure 8 is a perspective view of one of the knife fingers which is inserted between the assembly blocks or units on the conveyer belt at the instant of shearing the covers and match strips.
Figure 9 shows an improved form of folding means for folding the covers over the match splints.
Figure 13 is a plan view of one end of the cover blocks, showing an improved detail construction over that shown in Figure 3.
Figure 14 is a side view of Figure 13.

Referring now particularly to the details wherein my present improvements reside, and particularly to Figure 3, the assembly conveyer belt, which extends transversely across the machine from a point near the guide members 23 to a point adjacent the packer 61 (see Fig. 2), is made up of links 18, although in place of the links a strip of thin steel may be used, as shown in my previous application. On this belt portion, whether made of links 18 or strip steel, are mounted a plurality of spaced assembly blocks 19 which are provided with a hub-portion 20, that are adapted to be fastened to the conveyer belt or links 18 by any suitable means as by screws 21.

Each of the blocks 19 is provided with a pair of spaced pins 22 which are pointed so as to perforate the cover paper 10. After passing through the guide members 23 (see Fig. 2), the cover strip 10 is forced over the pins 22 by means of a roller 14. The roller 14 may be provided with flanges 24 for creasing the cover if desired. After leaving the roller 14, the cover strip 10 is brought forward intermittently by the pins 22 on the blocks 19 comprising part of the conveyer belt which is operated intermittently by a suitable gear 25. As the cover strip 10 is brought to rest by the intermittent action of the assembly conveyer or belt, the ejector fingers 26 cooperate with the main conveyer belt carrying the match strips, all as described in my previous application, to eject at least a pair of the strips indicated at 27 on to a narrow platform (not shown) just above the cover strip 10 which passes directly below the platform.

Figure 4:
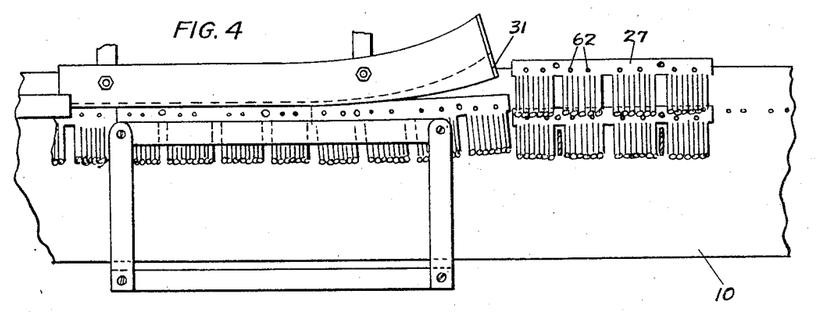
Figure 4 shows part of the mechanism used for aligning the splints into proper position on the pins carried by the units comprising the conveyer belt, as shown in Figure 3.
Figure 5:
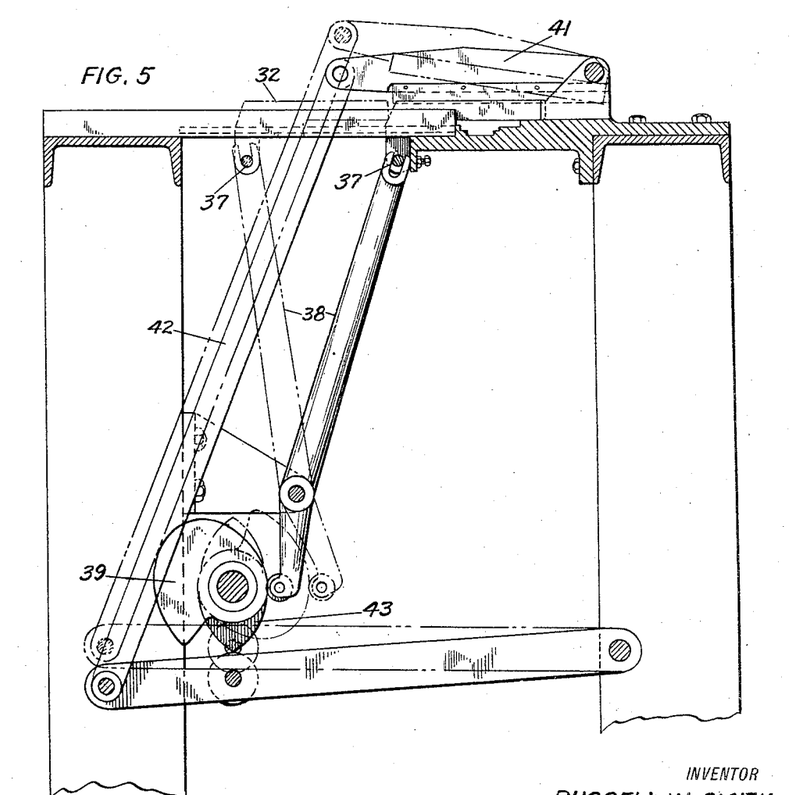
Figure 5 is a vertical section through the assembly part of the machine, showing only the knives and means for operating them, which are used for shearing the match splints and covers simultaneously after the splints have been placed on the strip cover, but before the cover is folded. Certain of the parts are shown in two positions of operation.
Figures 10, 11, 12, 15:
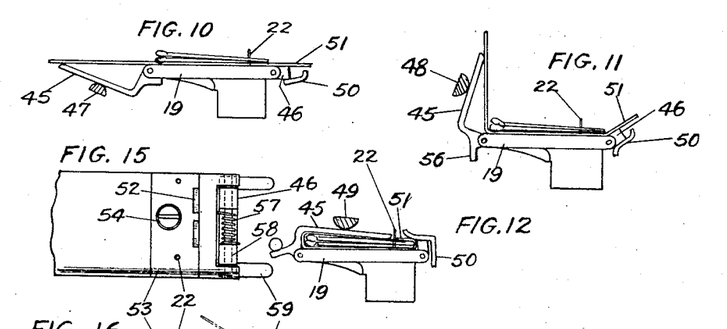
Figure 10 is a view on a reduced scale, showing the folding block or unit of the assembly conveyer belt, with the cover and match splints in position ready to fold the cover.
Figure 11 is similar to Figure 10, but with the cover partly folded.
Figure 12 shows the cover in fully folded position.
Figure 15 is a view similar to Figure 13, but of a further modified and improved form of means for folding the cover at the stub end of the match strip.
Figure 16:
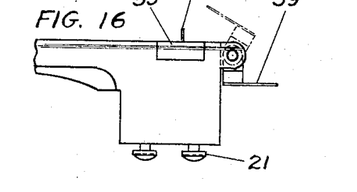
Figure 16 is a side elevation of Figure 15, also showing the movable part in dotted lines in fully operated position.

In Figure 2, a match strip 27 is shown in position over the conveyer belt just previous to the action thereon of the ejector fingers 26. As the ejector fingers 26 act on the back of the match strip 27 to force it from the clips on the conveyer belt, the aligning belt 28 carrying a plurality of aligning fingers 29, comes to rest in such a position that the fingers 29 are in alignment with the two outside slots 30 so that the fingers enter the slots when the strip 27 is ejected from the main conveyer belt. The fingers 29 on the next movement of the assembly conveyer belt, carry the match strip to the left into the aligning throat 31 (see Fig. 4). This aligning throat is suitably formed so as to bring the strip 27 into perfect alignment in cooperation with the fingers 29 with the pins 22 on the blocks 19, thereby assembling a pair of match strips 27 over the cover paper on the blocks 19, it being understood that holes 62 for the pins 22 are punched by the press when the splints are being formed. This assembly of the cover and match strips is shown in Figure 10.

In my application previously referred to, I folded the cover which had been slitted for part of its length, over the match strips and then completed the cutting operation, whereas, in my present case, I prefer to cut the cover paper and the match strips before folding the covers. In cutting the cover strip and the match strips while lying in the position shown in Figure 10, some means must be provided to support the strips from the bottom while the shearing means, in this case knives, are in operation, and this is provided by means of the shearing fingers 32, preferably provided with renewable hardened shearing plates 33 held thereto in any satisfactory manner as by screws 63, to provide a good cutting edge for the knives. Each of the shearing fingers 32 is provided with a guide-way 34 and a shank 35 having a hole 36 therein to receive a pin 37 through the medium of which the shearing fingers 32 are operated by means of a lever 38 operated by a cam 39 driven by a suitable part of the machine.

Figures 6, 17:
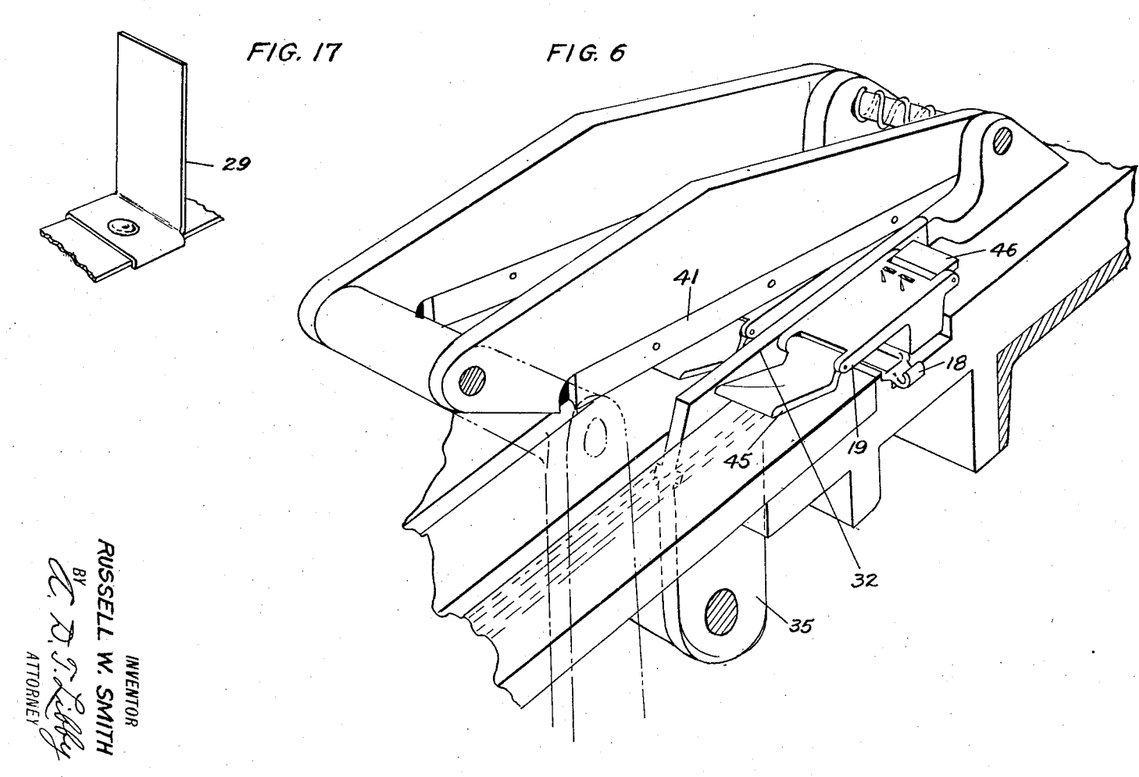
Figure 6 shows part of the assembly conveyer belt positioned below the shearing knives when the knives are in cutting position, only two of the knives being shown on an enlarged scale from that shown in Figure 5.
Figure 17 shows a perspective view of one of the aligning fingers used on the aligning mechanism used at the beginning of the assembly operation.
Figure 7:
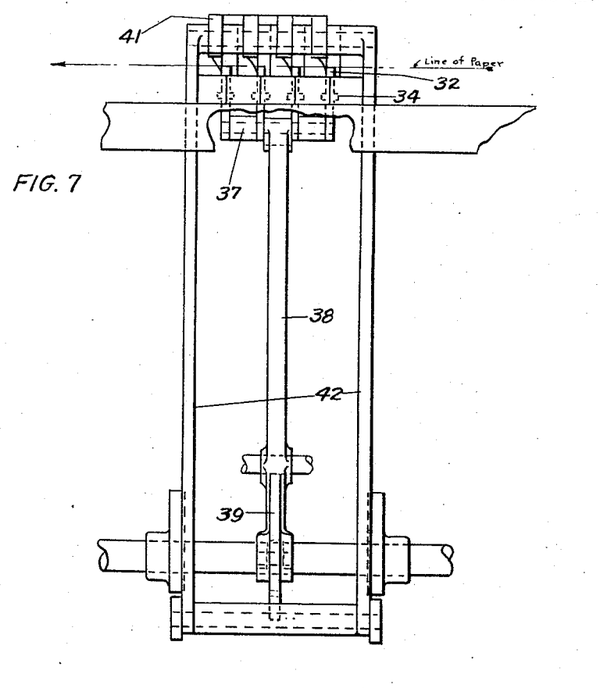
Figure 7 is a front elevation of Figure 5.

As shown in Figures 2 and 6, the shearing fingers 32 are shown inserted within the space 40 (see Fig. 3) between the blocks 19. At the time when the shearing fingers 32 have been inserted between the blocks 19 as just described, the knife blades 41 are brought downward by means of suitable cam and lever actions, the lever being indicated by 42 and the cam by 43. As shown in Figure 2, four of these shearing fingers 32 and four knives 41 are indicated, only two knives 41 being shown in Figure 6. The operation of the knives 41 cuts through the cover strip 10 and the splint strips, severing them simultaneously into individual match book units.

On completion of the cutting stroke of the knives 41, the knives are operated to their uppermost position by means of the cams 43 and the levers 42, and at the same time the shearing fingers 32 are withdrawn laterally by means of the guide-ways 34 acting in conjunction with the guide-plates 44. The assembly conveyer belt is then ready to be moved forward by the gear 25 for the next successive assembly operation, and these operations are continued intermittently and successively as the main conveyer 6 brings the match splints forward continuously to the assembly part of the machine as described.

Having severed the cover strip and match strips into individual match book units, on the individual blocks 19, the folding operation is ready to begin. Each of the blocks 19 is provided at one end with a movable plate 45, and at the other end with a movable member 46. Referring to Figure 9, it will be seen that the folding operation begins by one end 47 of an elongated cam coming into engagement with the movable member 45, and as the assembly belt travels forward, the member 45 is moved to the different positions shown in Figures 10, 11, and 12.

In Figure 11, the member 45 is moved into position as shown by that portion of the cam numbered 48. When the blocks 19 reach approximately the central portion of the elongated cam, this part of the cam, numbered 49, will be in the position shown in Figure 12, in which position the member 45 is moved to its full limit, moving the cover to a fully closed position over the splints.

While the above folding operations have been going on, the movable member 46, of each of the blocks 19 of the folding mechanism, engages another cam 50, so shaped as to move the edge 51 of the cover 10 so as to bring it to the position shown in Figure 12 at the proper time, overlapping that part of the cover which lies over the splints. While the match book is held in the position shown in Figure 12 by the cams, it is moved to the stitcher 17 which stitches a plurality of the books at a time. This stitching operation is carried out by means of grooves 52 in the blocks 19. The grooves 52 are so shaped that as the staple is driven through the match book, the ends are bent in toward each other and the stitch completed in the usual way.

In the form shown in Figures 13 to 16 inclusive, I have shown an insert plate 53 preferably made of hardened steel, which carries the pins 22. The plate 51 is held in position by any suitable means as by a screw 54. This construction allows the pins to be renewed if they should accidentally become broken, or become unduly worn. Furthermore, the grooves 52 are cut in this hardened plate and the operation of the stitcher is thereby improved.

Having completed the stitching of the match books, they are ready to be delivered from the blocks 19. This is accomplished by providing the machine with a cam 55 which engages the stub-end 56 of the movable member 45, thereby moving the member 45 back to its normal position shown in Figure 10. In a similar manner, the member 46 may be moved back to its normal position, but I prefer to use the construction shown in Figures 15 and 16, whereby the member 46 is automatically returned by a spring 57 supported on the pivot pin 58 that carries the member 46. In this particular form, the folding of the end 51 of the cover strip is performed by two fingers 59 engaging the outside edges of the end 51. By this construction, the fold is made more uniform.

It may also be noted that the separate folding operation performed on each of the blocks 19, provides a somewhat better looking match book, because it eliminates smearing of any ink that is not thoroughly dried on the covers, besides, a somewhat cleaner cut can be made by making the cut when the parts are in the position shown in Figure 10.

As soon as the members 45 and 46 are moved to their open position following the stitching operation, the match books are ready to be ejected from the pins 22 on the blocks 19, and this is accomplished by providing the blocks 19 with slots 60 which are adapted to receive an extracting finger (not shown) as the assembly belt or conveyer is moved forward. After being ejected from the blocks 19, the match books are then delivered to the packing mechanism 61 forming part of the machine, where they are packed ready for shipment.

It will be evident that the details for carrying my invention into operation may be varied to a considerable extent, and I therefore do not wish to be unduly limited to this specification or the scope of the appended claims.

Having thus described my invention, what I claim is:

1. In a match book machine including a portion for assembling the match splint strips and covers; an assembly conveyer belt having a driven part, means for driving said part, a plurality of assembly blocks mounted in spaced relation on said driven part, means on said blocks for engaging and holding the strip for making the covers, means for passing the splint strips onto said blocks over the cover strip, means for shearing the cover strip and splint strips between said blocks into individual units, means including movable parts on said blocks for folding the cover ends over the splint strip on the blocks, means for stitching the covers to their respective splint strips while the covers are held in folded position, means for releasing the cover holding means, ready for ejecting the match books from the blocks.

2. In a match book machine including a portion for assembling the match splint strips and covers; an assembly conveyer belt having a driven part, means for intermittently driving said part, a plurality of assembly blocks mounted in spaced relation on said driven part, means on said blocks for engaging and holding the strip for making the covers, means for passing the splint strips onto said blocks over the cover strip, means for shearing the cover strip and splint strips between said blocks into individual units, said shearing means including at least one cutting member and a cooperating shearing finger and means for inserting said shearing finger between two assembly blocks during the intermittent cycle of movement of said assembly blocks, means including movable parts on said blocks for folding the cover ends over the splint strip on the blocks, means for stitching the covers to their respective splint strips while the covers are held in folded position, means for releasing the cover holding means, ready for ejecting the match books from the blocks.

3. In a match book machine including a portion for assembling the match splint strips and covers; an assembly conveyer belt having a driven part, means for driving said part, a plurality of assembly blocks mounted in spaced relation on said driven part, means on said blocks for engaging and holding the strip for making the covers, means for passing the splint strips onto said blocks over the cover strip, means for shearing the cover strip and splint strips between said blocks into individual units, means including movable parts on said blocks for folding the cover ends over the splint strip on the blocks, means for stitching the covers to their respective splint strips while the covers are held in folded position, said stitching means including grooves in said blocks for guiding the staple from the stitching mechanism, means for releasing the cover holding means, ready for ejecting the match books from the blocks.

4. In a match book machine including a portion for assembling the match splint strips and covers; an assembly conveyer belt having a driven part, means for intermittently driving said part, a plurality of assembly blocks mounted in spaced relation on said driven part, means on said blocks for engaging and holding the strip for making the covers, means for passing the splint strips onto said blocks over the cover strip, means for shearing the cover strip and splint strips between said blocks into individual units, said shearing means including at least one cutting member and a cooperating shearing finger and means for inserting said shearing finger between two assembly blocks during the intermittent cycle of movement of said assembly blocks, means including movable parts on said blocks for folding the cover ends over the splint strip on the blocks, means for stitching the covers to their respective splint strips while the covers are held in folded position, said stitching means including hardened plates having grooves therein for guiding the staple from the stitching mechanism, said plates also carrying said cover strip engaging and holding means, means for releasing the cover holding means, ready for ejecting the match books from the blocks.

5. In a match book machine including a portion for assembling the match splint strips and covers; an assembly conveyer belt having a driven part, means for driving said part, a plurality of assembly blocks mounted in spaced relation on said driven part, pins on said blocks for perforating and holding the strip for making the covers whereby the strip is drawn along with the blocks, means for passing the splint strips onto said blocks over the cover, and aligning them over said pins, means for shearing the cover strip and splint strips between said blocks into individual units, means including movable parts on said blocks for folding the cover ends over the splint strip on the blocks, means for stitching the covers to their respective splint strips while the covers are held in folded position, means for releasing the cover holding means, ready for ejecting the match books from the blocks.

6. In a match book machine including a portion for assembling the match splint strips and covers; an assembly conveyer belt having a driven part, means for intermittently driving said part, a plurality of assembly blocks mounted in spaced relation on said driven part, pins on said blocks for perforating and holding the strip for making the covers whereby the strip is drawn along with the blocks, means for passing the splint strips onto said blocks over the cover, means for aligning them over said pins, means for shearing the cover strip and splint strips between said blocks into individual units, said shearing means including at least one cutting member and a cooperating shearing finger and means for inserting said shearing finger between two assembly blocks during the intermittent cycle of movement of said assembly blocks, means including movable parts on said blocks for folding the cover ends over the splint strip on the blocks, means for stitching the covers to their respective splint strips while the covers are held in folded position, said stitching means including hardened plates having grooves therein for guiding the staples from the stitching mechanism, said plates also carrying said pins, means for releasing the cover holding means, ready for ejecting the match books from the blocks.

7. In a complete match book machine, a part for forming match splints from a continuous strip of material, said part acting to perforate the strip for use in a future assembly operation, a part for receiving a continuous cover strip, applying abrasive material thereto and printing the same and assembling the splint strips with the cover strip, a continuously moving conveyer for receiving from the first-mentioned part the splints and carrying the splint strips to the assembly part of the machine, said assembly part including; an assembly conveyer provided with means for intermittently moving it and aligning means for properly positioning the splint strips as they are delivered from the first conveyer, so said perforations can be engaged; blocks carried by the assembly conveyer in spaced relation, pins carried by said blocks to perforate and draw the cover strip through the machine, said pins acting as receivers for the splint strips by receiving said perforations during said aligning process, means for shearing the cover strip and splint strips between said blocks into individual units during the stationary portion of the intermittent movement of the assembly conveyer, means including movable parts on said blocks for folding the cover ends over the splint strip on the blocks, means for stitching the covers to their respective splint strips while the covers are held in folded position, means for releasing the cover holding means, ready for ejecting the match books from the blocks.

8. In a complete match book machine, a part for forming match splints from a continuous strip of material, said part acting to perforate the strip for use in a future assembly operation, a part for receiving a continuous cover strip, applying abrasive material thereto and printing the same and assembling the splint strips with the cover strip, a continuously moving conveyer for receiving from the first-mentioned part the splints and carrying the splint strips to the assembly part of the machine, said assembly part including; an assembly conveyer provided with means for intermittently moving it and aligning means for properly positioning the splint strips as they are delivered from the first conveyer, so said perforations can be engaged; blocks carried by the assembly conveyer in spaced relation, pins carried by said blocks to perforate and draw the cover strip through the machine, said pins acting as receivers for the splint strips by receiving said perforations during said aligning process, means for shearing the cover strip and splint strips between said blocks into individual units during the stationary portion of the intermittent movement of the assembly conveyer, said shearing means including at least one cutting member and a cooperating shearing finger and means for inserting said shearing finger between two assembly blocks during the intermittent cycle of movement of said assembly blocks, means including movable parts on said blocks for folding the cover ends over the splint strip on the blocks, means for stitching the covers to their respective splint strips while the covers are held in folded position, means for releasing the cover holding means, ready for ejecting the match books from the blocks.

9. An assembly conveyer for a match book machine comprising; a part adapted to be driven by a suitable member of the machine and a plurality of spaced blocks carried by said driven part; each of said blocks having: at least one pin for perforating the book cover strip for the purposes described, a rotatable member at each end adapted to be acted on to fold the covers over the splints after they have been cut into individual units, and at least one groove for co-operation with a stitching mechanism.

10. An assembly conveyer for a match book machine comprising; a part adapted to be driven by a suitable member of the machine and a plurality of spaced blocks carried by said driven part; each of said blocks having: at least one pin for perforating the book cover strip for the purposes described, a rotatable member at each end adapted to be acted on to fold the covers over the splints after they have been cut into individual units, and at least one groove for co-operation with a stitching mechanism, and further means for assisting in removing the finished books from the block.

11. An assembly conveyor for a match book machine comprising; a part adapted to be driven by a suitable member of the machine and a plurality of spaced blocks carried by said driven part; each of said blocks having: at least one pin for perforating the book cover strip for the purposes described, a rotatable member at each end adapted to be acted on to fold the covers over the splints after they have been cut into individual units, and at least one groove for co-operation with a stitching mechanism, and means for automatically returning at least one of said rotatable members on the block to normal position after the stitching of the book has been done.

12. An assembly conveyer for a match book machine comprising; a part adapted to be driven by a suitable member of the machine and a plurality of spaced blocks carried by said driven part; each of said blocks having: at least one pin for perforating the book cover strip for the purposes described, a rotatable member at each end adapted to be acted on to fold the covers over the splints after they have been cut into individual units, at least one of said rotatable members having a pair of spaced fingers for engaging the edges of the cover during the folding operation, and at least one groove for cooperation with a stitching mechanism.

13. An assembly conveyer for a match book machine comprising; a part adapted to be driven by a suitable member of the machine and a plurality of spaced blocks carried by said driven part; each of said blocks having: at least one pin for perforating the book cover strip for the purposes described, a rotatable member at each end adapted to be acted on to fold the covers over the splints after they have been cut into individual units, at least one of said rotatable members having a pair of spaced fingers for engaging the edges of the cover during the folding operation, and spring means on the block for automatically returning the rotatable member having said spaced fingers to normal position after the stitching of the book has been completed, and at least one groove for cooperation with a stitching mechanism.

14. An assembly conveyer for a match book machine comprising a part adapted to be driven by a suitable member of the machine and a plurality of spaced blocks carried by said driven part; each of said blocks having: at least one pin for perforating the book cover strip for the purposes described, a rotatable member at each end adapted to be acted on to fold the covers over the splints after they have been cut into individual units, said blocks also having at least one groove for co-operation with a stitching mechanism, one of said rotatable members having a part to be engaged by a cam for moving it back to normal position after the stitching has been completed while the other rotatable member is provided with spring means for returning it to normal position.

15. An assembly conveyer for a match book machine comprising a part adapted to be driven by a suitable member of the machine and a plurality of spaced blocks carried by said driven part; each of said blocks having: a quickly renewable plate, said plate carrying a pair of pointed pins for the purposes described and having a pair of grooves for cooperation with a stitching mechanism, and members pivoted at each end of the block and normally lying substantially in the plane of the face of the block and adapted to be acted on by other parts of the machine as said conveyer moves to swing them about their pivots to fold the covers over the splints after they have been cut into individual units.

16. An assembly conveyer for a match book machine comprising a part adapted to be driven by a suitable member of the machine and a plurality of spaced blocks carried by said driven part; each of said blocks having: a quickly renewable plate, said plate carrying a pair of pointed pins for the purposes described and having a pair of grooves for cooperation with a stitching mechanism, and members pivoted at each end of the block and normally lying substantially in the plane of the face of the block and adapted to be acted on by other parts of the machine as said conveyer moves to swing them about their pivots to fold the covers over the splints after they have been cut into individual units, both of said pivoted members having means for at least assisting in returning them to normal position after the stitching has been completed.

17. An assembly conveyer for a match book machine comprising a part adapted to be driven by a suitable member of the machine and a plurality of spaced blocks carried by said driven part; each of said blocks having: a quickly renewable plate, said plate carrying a pair of pointed pins for the purposes described and having a pair of grooves for cooperation with a stitching mechanism, and members pivoted at each end of the block and normally lying substantially in the plane of the face of the block and adapted to be acted on by other parts of the machine as said conveyer moves to swing them about their pivots to fold the covers over the splints after they have been cut into individual units, at least one of said pivoted members having a spring associated therewith to automatically return it to normal position after the stitching has been completed.

18. In a match book machine, having an assembly conveyor including spaced blocks with mechanism for assembling splint strips and cover paper on said blocks, and further mechanism for intermittently moving said conveyor: shearing means for severing the match splints and cover paper into individual units for books while on said blocks.

19. In a match book machine, having an assembly conveyor including spaced blocks with mechanism for assembling splint strips and cover paper on said blocks, and further mechanism for intermittently moving said conveyor: shearing means for severing the match splints and cover paper into individual units for books while on said blocks and before the cover paper is folded over the splints and the books are completed.

20. In a match book machine, having an assembly conveyor including spaced blocks with mechanism for assembling splint strips and cover paper on said blocks, and further mechanism for intermittently moving said conveyor: shearing means for severing the match splints and cover paper into individual units for books while on said blocks, said shearing means including reciprocating fingers each having a cooperative shearing edge with means for inserting said fingers laterally between said blocks at a time when said conveyer is not moving, and knives brought into cooperation with said finger shearing edges to shear the splint strips and cover paper, said knives and fingers being returned to normal position before the said conveyer is moved to a succeeding position.

21. In a match book machine, having an assembly conveyor including spaced blocks with mechanism for assembling splint strips and cover paper on said blocks, and further mechanism for intermittently moving said conveyor: shearing means for severing the match splints and cover paper into individual units for books while on said blocks, said shearing means including members each having a shearing edge insertible between said blocks when said conveyer is not moving, and knives brought into cooperation with said finger shearing edges to shear the splint strips and cover paper, said knives and fingers being returned to normal position before the said conveyer is moved to a succeeding position.

22. In a complete match book making machine having the following instrumentalities; mechanism for taking in a continuous strip of cardboard or the like and forming match splint strips therefrom, mechanism including a single conveyor for receiving said formed splint strips and for dipping said strips into inflammable material and for tipping said splints with an igniting compound and drying the splints while on said conveyor, mechanism for taking in at the same time a continuous strip of paper for book-covers for said splints, means for applying an abrasive material to the cover paper, means for printing suitable inscriptions on said cover paper, means for drying the abrasive material and the printing on the cover paper, means for then assembling the splint strips and cover paper together into book-forming position; further characterized by having means for then shearing the strips and cover paper simultaneously into individual book units, means for then folding the covers over the book units, and means for then stitching the cover and splint strips of each unit into a match book ready for delivery from the machine.

In testimony whereof, I affix my signature.
RUSSELL W. SMITH.